April 1, 1924.  1,489,203
D. I. GEROW
BRAKE
Filed Nov. 11, 1922  3 Sheets-Sheet 1
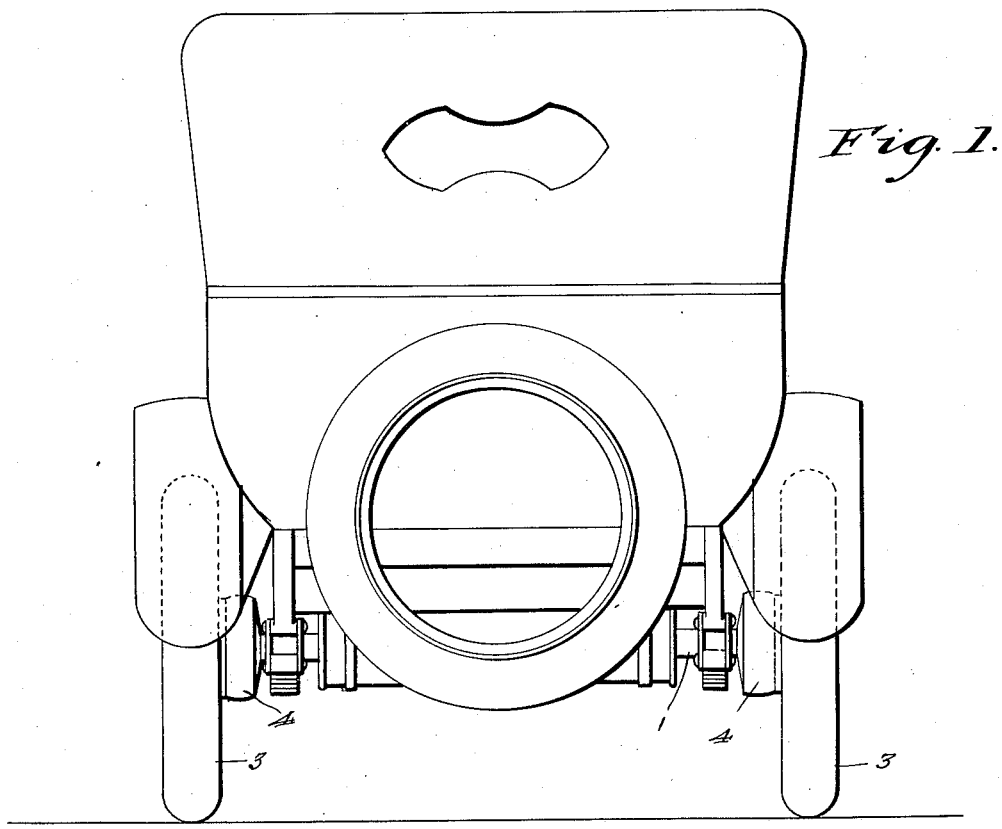
Fig. 1.
Fig. 8.
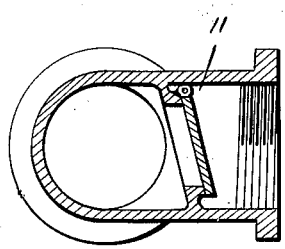
D. I. Gerow INVENTOR
BY Victor J. Evans
WITNESSES  ATTORNEY April 1, 1924.

D. I. GEROW

BRAKE

Filed Nov. 11, 1922   3 Sheets-Sheet 2

D. I. Gerow
INVENTOR

WITNESSES

BY Victor J. Evans
ATTORNEY

April 1, 1924. 1,489,203
D. I. GEROW
BRAKE
Filed Nov. 11, 1922 3 Sheets-Sheet 3

Patented Apr. 1, 1924.                                              1,489,203

UNITED STATES PATENT OFFICE.

DONALD I. GEROW, OF BUFFALO, NEW YORK.

BRAKE.

Application filed November 11, 1922. Serial No. 600,383.

*To all whom it may concern:*

Be it known that I, DONALD I. GEROW, a subject of King George V of Great Britain, residing at Buffalo, in the county of Erie and State of New York, have invented new and useful Improvements in Brakes, of which the following is a specification.

This invention relates to a brake for motor vehicles, and the like, the general object of the invention being to provide fluid circulating means which are connected with the drive wheels of the vehicle with means for preventing the circulation of fluid when it is desired to stop the vehicle.

Another object of the invention is to provide relief means for preventing injury to the parts under unusual conditions.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a rear view of a motor vehicle showing my invention in use.

Figure 8 is a section on line 8—8 of Figure 2.

Figure 2:
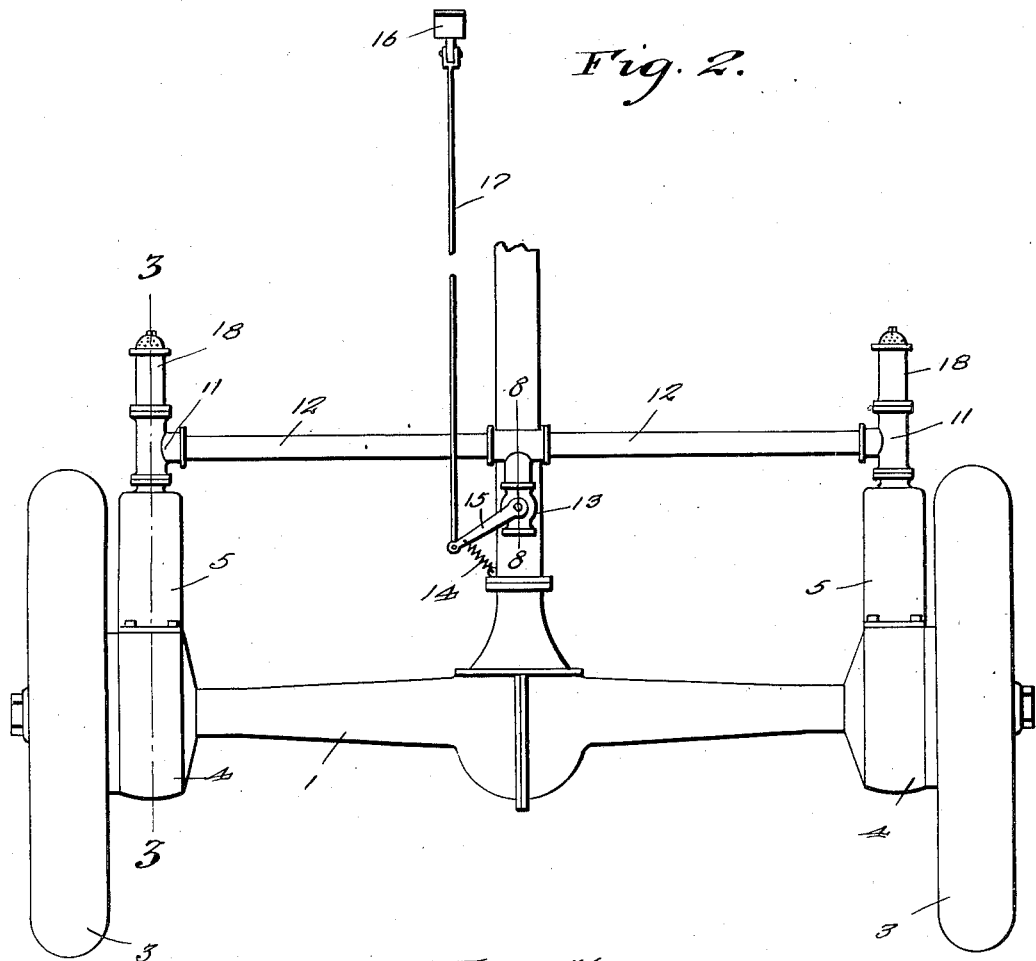
Figure 2 is a plan view with parts broken away.
Figure 3:
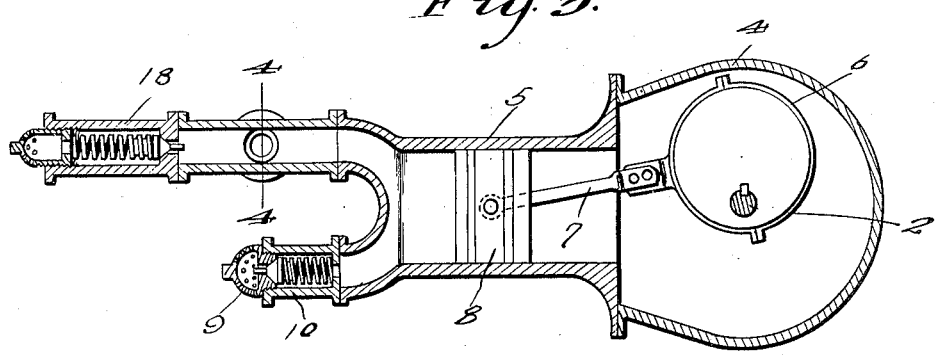
Figure 3 is a section on line 3—3 of Figure 2.
Figure 4:
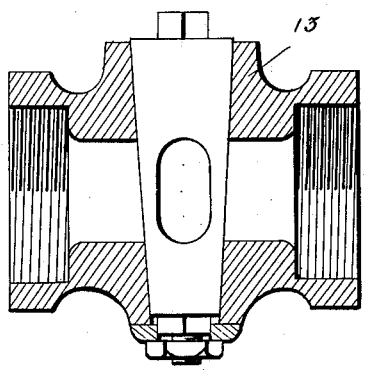
Figure 4 is a section on line 4—4 of Figure 3.
Figure 5:
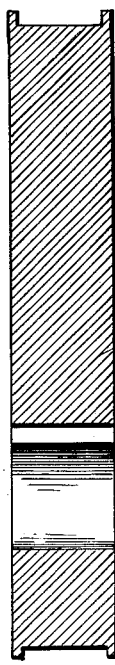
Figure 5 is a sectional view through the eccentric.

In these views 1 indicates the rear axle housing of a motor vehicle, 2 the drive shafts to which the rear wheels 3 are connected. In carrying out my invention I place cam housings 4 at each end of the housing 1 and connect a pump cylinder 5 to each housing 4. A cam 6 is secured to each drive shaft 2 and this cam is connected by the rod 7 with the piston 8 in the cylinder. Thus the rotary movement of the drive shafts will reciprocate the pistons. A screened inlet 9 is connected with each cylinder, each inlet having a valve 10 therein for preventing the exhaust of air through the inlet on the compression stroke of the piston. The valved outlet 11 of each cylinder is connected by a pipe 12 to a common outlet valve 13 which is normally held open by a spring 14 engaging the arm 15 of the valve. A foot pedal 16 is placed adjacent the driver's seat and this pedal is connected by the rod 17 with the arm 15 so that when the pedal is depressed the valve will be closed. An emergency valve 18 is connected with each pump cylinder to prevent damage to the parts through careless use. These valves are set to a load sufficient to stop a car.

From the above it will be seen that when the car is traveling along the pistons of the pumps will be reciprocated through the action of the drive shafts. Air will be sucked in through the inlets 9 and exhaust through the valve 13 so that the motor vehicle will not be affected by the device. When it is desired to stop the vehicle, however, the foot pedal is depressed to close or partly close the valve 13, thus preventing the circulation of air by the pumps and the pressure of the trapped air will act as a brake to the pistons of the pumps and thus check the rotation of the shafts.

Figure 7:
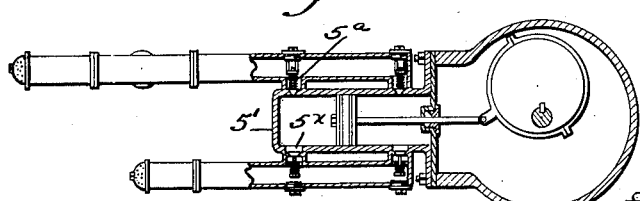
Figure 7 is a sectional view showing a double acting pump.
Figure 6:
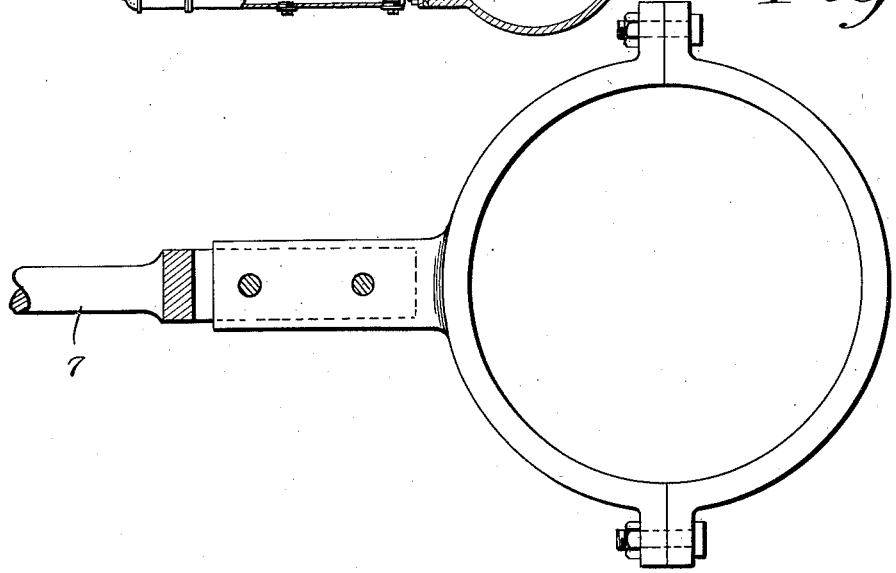
Figure 6 is a detail view partly in section of the eccentric strap and a part of the piston rod.

Figure 7 shows a double acting pump wherein the cylinder 5' is provided with a pair of inlet valves 5ˣ and a pair of outlet valves 5ᵃ which are so arranged that the piston will draw in air and exhaust it at each stroke.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a motor vehicle, a pair of housings connected with the rear axle housing thereof, a cam in each housing and connected with the drive shaft, a pump cylinder connected with each housing, a cylinder in each pump, a rod connecting the same with the cam, an exhaust valve, pipes connecting the pump cylinders with said valve, inlet means for each cylinder, a relief valve for each cylinder and manually operated means for closing the exhaust valve.

2. In a motor vehicle, a housing connected with a part thereof, a cylinder connected with the housing, a cam in the housing and attached to a rotatable part of the vehicle, a piston in the cylinder, a connecting rod connecting the same with the cam, an exhaust valve, pipes connecting the same with the cylinder, manually operated means for actuating the exhaust valve and inlet means for the cylinder.

In testimony whereof I affix my signature.

DONALD I. GEROW.